(No Model.)

W. WHEELER.
REFLECTOR.

No. 247,282. Patented Sept. 20, 1881.

Witnesses
S. N. Piper

Inventor.
William Wheeler
by R. H. Eddy atty.

UNITED STATES PATENT OFFICE.

WILLIAM WHEELER, OF CONCORD, MASSACHUSETTS.

REFLECTOR.

SPECIFICATION forming part of Letters Patent No. 247,282, dated September 20, 1881.

Application filed May 23, 1881. (No model.)

*To all whom it may concern:*

Be it known that I, WILLIAM WHEELER, of Concord, of the county of Middlesex and State of Massachusetts, have invented certain new and useful Improvements in Reflectors; and I do hereby declare the same to be described in the following specification, reference being had to the accompanying drawings, hereinafter explained.

The said improvements consist in a reflector formed in two parts, constructed upon different curvatures, and joining each other at or near the horizontal plane of their common linear focus, each of the said parts having a linear focus and a reflecting-surface generated by the revolution or movement of a conic sectional curve about one or more lines intersecting its axis, or axis produced, at right angles, the said curve revolving or moving, in the aggregate, three hundred and sixty degrees about the said line or lines. The line or path described by the focus of the said curve may therefore be circular, polygonal, elliptical, or even a right line, which latter is an extreme modification of the ellipse.

Figure 1:
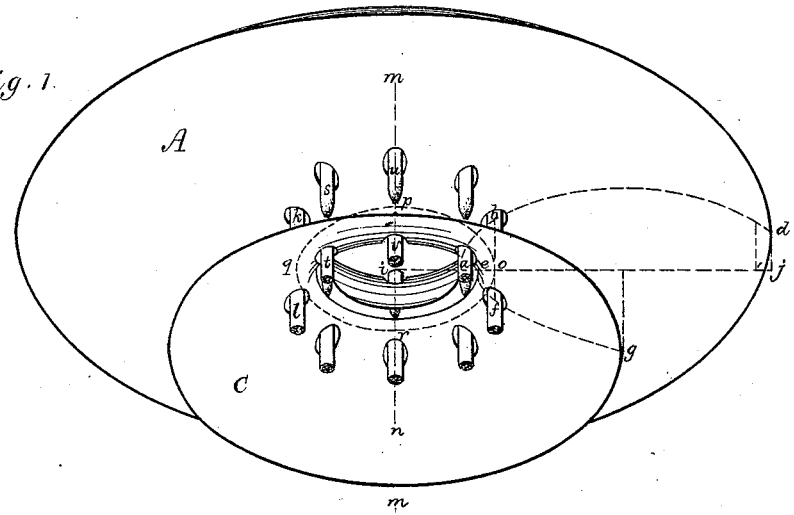
Figure 2:
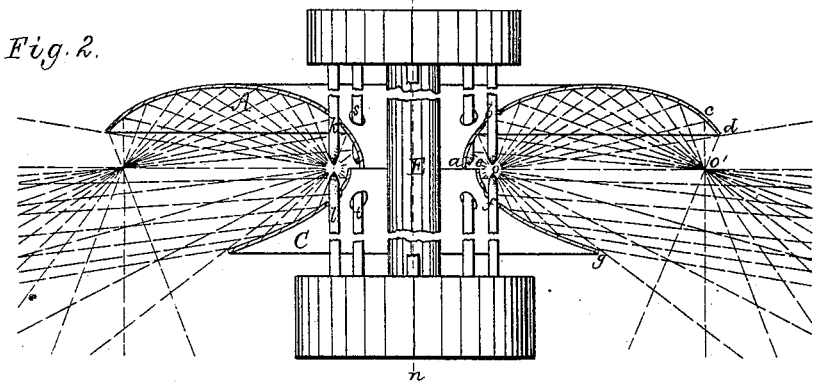
Figure 3:
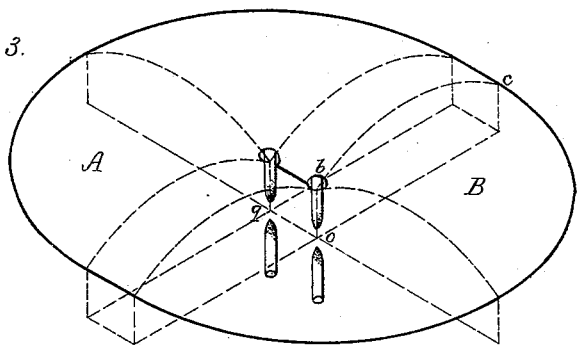

Figures 1 to 3, inclusive, represent some of the different forms of my invention. Fig. 1 is an isometric projection of a double reflector, the upper and lower parts of which are constructed upon different curvatures, in which the reflecting-surface of each part is such as would be described by the revolution of the curve of a conic section about a line outside of such section and lying in the plane thereof, such line intersecting the axis produced, whereby the focus of the generating-curve describes the circumference of a circle coincident with or constituting the curvilinear focus of the reflecting-surface thus described. Fig. 2 shows a vertical section of the aforesaid reflector, together with an electric lamp, designed to produce and maintain therewith several electric arcs in the said curvilinear focus.

In some cases the conic section may be revolved about a line at right angles to the axis of the curve, and extended between the focus and the vertex of the curve, in which case the line would be inside of the curve.

In said Figs. 1 and 2, A denotes the upper reflector, the reflecting-surface of which is of such form as would be described by the revolution of the elliptic curve $a\ b\ c\ d$ through an angular space of three hundred and sixty degrees about the line $m\ n$, which lies outside of the curve, but in the plane of said curve produced, and intersects perpendicularly in the point $i$, the produced axis $i j$ of the curve. By the revolution of the focus $o$ of said curve, about the said line $m\ n$, the circumference $o\ p\ q\ r$ is described, constituting a curvilinear or circular focus of the reflecting-surface A, in which the lights generated between the several carbon pencils $k$ and $l$, $s$ and $t$, $u$ and $v$, &c., are maintained. In like manner the reflecting-surface of the lower reflector, C, would be described by the revolution about the line $m\ n$ of the conic or hyperbolic curve $e f g$, having the focus $o$, common to both the upper and lower parts, A and C.

It is evident that the upper and lower parts of the double reflector A C may be made continuous with each other at their vertices $a$ and $e$, either by adopting generating-curves of different conic sections having a common vertex and focus, or by using throughout a curve of the same conic section.

When the horizontal angular space to be lighted by the use of a reflector of this description is less than three hundred and sixty degrees the revolution of the generating-curve upon which such reflector is formed, about the line $m\ n$, should be limited to the required angular extent, and each of the ends of the reflector so defined is to be formed by the revolution of the said generating-curve about its principal axis $i\ j$ through an arc of one hundred and eighty degrees, whereby the width of the aperture of the reflector may be limited or varied. In other words, this invention includes the formation of a reflector having a continuous reflecting-surface, such as would be generated by the revolution of a conic sectional curve, in manner substantially as described, about two or more axes of revolution successively, the said axes intersecting each other in any point or points of the principal axis, or axis produced of said curve.

The orifice or opening through the reflector A C, formed within the circle described by the vertex $a$ of the generating-curve, may be occupied by the standard E of the lamp, (shown in combination therewith,) or by the shaft of a column or tower upon which the cluster of lights is to be maintained, or it may be used as a man-hole, all depending upon the size of the reflector, the manner in which it is mounted, and the uses to which it is applied.

Fig. 3 is an isometric projection of a reflector in which the reflecting-surface is such as would be generated by the successive semi-revolutions of a conic-section curve about its *latus rectum*, and by intermediate and intermittent movements of the whole of said curve equally in opposite directions, whereby the focus of said curve describes a straight line, which contains the foci of all the surfaces thus described.

In said Fig. 3, A and B denote the reflecting-surfaces such as would be described by the two semi-revolutions and two intermediate rectilinear movements of the elliptic curve $b$ $c$—that is to say, the elliptic curve is first to be moved around its *latus rectum* through an arc of one hundred and eighty degrees; next it is to be moved laterally and rectilinearly a suitable distance, $o\ q$; next it is to be revolved on its *latus rectum* another half a revolution, after which it is to be moved rectilinearly and laterally back to its starting position. This form of reflector is especially intended for use with single lamps in which two sets of carbon pencils are employed, the second set to be automatically put into the electric circuit only when the others are consumed, thereby extending the effective duration of the light. The same form of lamps are particularly well adapted for use in the reflector shown in Figs. 1 and 2, a constant light being maintained between the alternate carbons only.

It has been noticed that the focal path or orbit of the generating-curve, under the form of revolution first described and shown in Fig. 1, is circular. If we conceive the radius of revolution, or the distance of the axis of revolution to the focus of the generating-curve, to be constantly variable, the said focal path or orbit may be elliptical, or be of some other curvilinear figure, while if the radius be made zero and infinity successively, the focal path will be a straight line or a succession of straight lines, as already shown in Fig. 3, and hence may be polygonal also. Hence, if an extra amount of light is required in any direction, the reflector may be so formed as to present at right angles to such direction a greater length of its linear focus. An elliptical focus, for instance, should present its broadest side toward the field or space to be most fully lighted.

Having thus described my invention, what I claim as new, and desire to secure by Letters Patent, is—

1. A reflector formed in two parts constructed upon different curvatures and joining each other at or near the horizontal of their common linear focus, each of said parts having a reflecting-surface such as would be generated by the revolution of a conic sectional curve about a line in the plane of said curve, and meeting the axis or the axis produced of the curve perpendicularly in some point other than the focus, substantially as set forth.

2. A reflector having a reflecting-surface such as would be generated by the revolution of a conic sectional curve about two or more axes of revolution successively, said axes intersecting each other in some point of the principal axis or the said axis produced other than the focus, substantially as set forth.

3. A reflector formed in two parts constructed upon different curvatures and joining each other at or near the horizontal of their common linear focus, each of said parts having a reflecting-surface generated by the revolution or movement of a conic sectional curve about one or more lines intersecting its axis or axis produced at right angles, the said curve revolving or moving in the aggregate three hundred and sixty degrees about the said line or lines, substantially as set forth.

WILLIAM WHEELER.

Witnesses:
R. H. EDDY,
E. B. PRATT.